United States Patent
Feldman

(10) Patent No.: US 9,882,601 B1
(45) Date of Patent: Jan. 30, 2018

(54) POWER AMPLIFIER WITH GROUND SWITCH FOR TRANSMIT/RECEIVE FUNCTIONALITY

(71) Applicant: Google Inc., Mountain View, CA (US)

(72) Inventor: Arnold Feldman, San Francisco, CA (US)

(73) Assignee: Google Inc., Mountain View, CA (US)

( * ) Notice: Subject to any disclaimer, the term of this patent is extended or adjusted under 35 U.S.C. 154(b) by 266 days.

(21) Appl. No.: 14/526,000

(22) Filed: Oct. 28, 2014

(51) Int. Cl.
H04B 1/44 (2006.01)

(52) U.S. Cl.
CPC .................................... H04B 1/44 (2013.01)

(58) Field of Classification Search
CPC ....................................................... H04B 1/44
USPC .......................................................... 455/78
See application file for complete search history.

(56) References Cited

U.S. PATENT DOCUMENTS

| | | | |
|---|---|---|---|
| 7,170,465 B2 | 1/2007 | Rofougaran | |
| 7,417,515 B2 | 8/2008 | Chominski | |
| 8,768,270 B2 | 7/2014 | Perumana et al. | |
| 2006/0170453 A1* | 8/2006 | Zerbe ................ | H04L 25/03057 326/37 |
| 2007/0232241 A1* | 10/2007 | Carley ..................... | H04B 1/44 455/83 |
| 2013/0169316 A1* | 7/2013 | Lee ........................... | H04L 5/16 327/108 |
| 2014/0035673 A1* | 2/2014 | Ortiz .................. | H03F 3/45076 330/261 |
| 2014/0087673 A1 | 3/2014 | Mostov et al. | |
| 2015/0094117 A1* | 4/2015 | Conta .................... | H04B 1/525 455/560 |

OTHER PUBLICATIONS

Cohen et al., "A CMOS Bidirectional 32-Element Phased-Array Transceiver at 60 GHz With LTCC Antenna," IEEE Transactions on Microwave Theory and Techniques, 61(3):1359-1375, Mar. 2013.

* cited by examiner

Primary Examiner — Raj Chakraborty
(74) Attorney, Agent, or Firm — Fish & Richardson P.C.

(57) ABSTRACT

A circuit includes a power amplifier that includes a transformer having a primary winding and a secondary winding. The secondary winding has a first terminal and a second terminal. The circuit also includes a transmit/receive switch electrically connected between the first terminal of the secondary winding and electrical ground. The second terminal of the secondary winding is electrically connected to an antenna that transmits signals based on an output of the power amplifier and to an input of a second amplifier that is also connected to the antenna. The transmit/receive switch selectively switches between a closed position that connects the secondary winding to ground in a transmit mode and an open position that disconnects the secondary winding from ground in a receive mode.

20 Claims, 6 Drawing Sheets

US 9,882,601 B1

POWER AMPLIFIER WITH GROUND SWITCH FOR TRANSMIT/RECEIVE FUNCTIONALITY

BACKGROUND

Transceivers are electronic devices that include a transmitter and a receiver and often use a common antenna to transmit and receive radio waves. The transmitter and receiver of a transceiver may include common circuitry or be separate devices, e.g., within a common housing or in separate housings. When an antenna presents a single interface to both a transmitter and a receiver, a transmit/receive switching function can be used to switch between transmit and receive modes of operation.

FIG. 1 is a schematic diagram of a conventional transmit/receive circuit 100 for an RF port 130. The RF port 130 electrically connects a PA 110 and a low noise amplifier (LNA) 140 to an antenna. The circuit 100 also includes a switch 120 that selectively allows signals output by the PA 110 to be applied to the antenna and a switch 150 that selectively allows the LNA 140 to receive signals from the antenna. For example, during transmit mode, the switch 120 may be closed to allow the PA output signals to reach the antenna by way of the RF port 130. The switch 150 may be open during transmit mode to provide a high impedance into the LNA (e.g., as seen from the RF port 130) and prevent PA output signals from reaching the LNA 140. During receive mode, the switch 150 may be closed to allow antenna signals to reach the LNA 140 and the switch 120 may be open to provide a high impedance into the PA 110 (e.g., as seen from the RF port 130) and prevent antenna signals from reaching the PA 110.

In this direct series configuration, the switch 120 provides a loss mechanism for the PA output signals. For example, the switch 120 and the antenna form a voltage divider network such that some of the voltage output by the PA 110 is loss at the switch 120. In addition, voltage swings on the PA side of the switch 120 should be limited in this configuration due to supply voltage and reliability considerations. For example, high voltage swings at the switch 120 can reduce the reliability of the switch 120. Also, the parasitic capacitance of the switch 120, especially if precautions are needed for ESD protection, can load the RF port 130 and can degrade the noise figure in receive mode.

SUMMARY

This specification describes technologies relating to transmit/receive switches.

In general, one innovative aspect of the subject matter described in this specification can be embodied in circuits that include: a power amplifier that includes a transformer having a primary winding and a secondary winding, the secondary winding having a first terminal and a second terminal; and a transmit/receive switch electrically connected between the first terminal of the secondary winding and electrical ground, wherein: the second terminal of the secondary winding is electrically connected to an antenna that transmits signals based on an output of the power amplifier and to an input of a second amplifier that is also connected to the antenna; and the transmit/receive switch selectively switches between: a closed position that connects the secondary winding to ground in a transmit mode; and an open position that disconnects the secondary winding from ground in a receive mode, wherein an impedance as seen from the second terminal of the secondary winding is at least a threshold amount higher than an input impedance of the second amplifier connected to the antenna when the transmit/receive switch is in the open position.

These and other embodiments can each optionally include one or more of the following features. In some aspects, the circuit includes one or more diodes electrically connected to a conductor that electrically connects the first end of the secondary winding to the transmit/receive switch. The one or more diodes can provide a path for electrostatic discharge currents.

Some aspects include one or more transistors that effectively short the primary winding of the transformer to electrical ground in the receive mode. The one or more transistors can be biased in a triode mode of operation in the receive mode. The one or more transistors can provide at least a threshold voltage drop between the primary winding and ground during the transmit mode. The one or more transistors can be biased in a saturation mode of operation in the transmit mode. The one or more transistors can include a first transistor that electrically connects a first end of the primary winding to ground and a second transistor that electrically connects a second end of the primary winding to ground.

In some aspects, the second amplifier includes an LNA that is electrically connected to the antenna and to a receiver. In some implementations, the power amplifier, the transformer, and the transmit/receive switch are fabricated on an integrated circuit chip.

In general, another aspect of the subject matter described in this specification can be embodied in circuits that include a transformer having a primary winding and a secondary winding, the primary winding having a first terminal at a first end of the primary winding and a second terminal at a second end of the primary winding opposite the first end, the secondary winding having a third terminal at a first end of the secondary winding and a fourth terminal at a second end of the secondary winding opposite the first end; a differential amplifier including a first transistor and a second transistor, the first transistor being electrically connected between the first terminal and electrical ground and the second transistor being connected between the second terminal and electrical ground; a transmit/receive switch connected between the third terminal and electrical ground, the transmit/receive switch having a first position that connects the third terminal to ground during a transmit mode of operation and a second position that disconnects the third terminal from ground in a receive mode of operation; and a transmit/receive port electrically connected to the fourth terminal, an antenna, and a second amplifier.

These and other embodiments can each optionally include one or more of the following features. Some aspects can include an electrostatic discharge circuit connected between the transmit/receive switch and the secondary winding of the transformer. In some implementations, the electrostatic discharge circuit can include one or more diodes.

In some aspects, the circuit includes an integrated circuit. Some aspects include a bias circuit that is connected to a gate of the first transistor and a gate of the second transistor and that biases the first transistor and the second transistor in a triode mode of operation in the receive mode.

Some implementations include a bias circuit that is connected to a gate of the first transistor and a gate of the second transistor and that biases the first transistor and the second transistor in a saturation mode of operation in the transmit mode. In some aspects, the second amplifier includes a low noise amplifier (LNA). In some aspects, the differential amplifier is an inverting differential amplifier.

In general, another aspect of the subject matter described in this specification can be embodied in methods that include the actions of providing a first biasing voltage to a first transistor and a second transistor of a power amplifier, the bias voltage being at a voltage level that causes the first transistor and the second transistor to operate in a saturation mode of operation, wherein the first transistor is connected between a first terminal of a primary winding of a transformer and electrical ground and the second transistor is connected between a second terminal of the primary winding and electrical ground; activating a transmit/receive switch of the power amplifier to place the power amplifier in a transmit mode of operation, the transmit/receive switch being connected between a secondary winding of the transformer and ground; receiving, by the power amplifier, a signal; amplifying, by the power amplifier, the received signal; and providing the amplified signal to an antenna.

Particular embodiments of the subject matter described in this specification can be implemented so as to realize one or more of the following advantages. By having a transmit/receive switch connected between the secondary of an output transformer of a power amplifier and ground, power loss to the amplifier's output signal caused by the switch is reduced relative to configurations in which a direct series transmit/receive switch is connected between the output of the power amplifier and the antenna. The reliability of the switch can be increased as the switch in this position is exposed to less signal swing than a direct series transmit/receive switch. A power amplifier having this configuration can transmit signals at higher power levels maintaining good signal integrity than a power amplifier having a direct series transmit/receive switch. Similarly, a low noise amplifier that shares an antenna with the power amplifier will suffer from less degradation in signal level due to power amplifier loading than a low noise amplifier that shares an antenna with a power amplifier having a direct series transmit/receive switch. This power amplifier configuration also allows for a separation between transmit and receive frequency bands.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

As transmit frequencies increase and in systems in which there are multiple antennas that are interfaced, e.g., phased array antennas, there is a desire to move transmit/receive switching on-chip due to costs and circuit board area concerns. Desirable properties of an on-chip switch are low (e.g., minimum) insertion loss in transmit mode to allow for increased (e.g., maximum) power amplifier (PA) efficiency, reliable operation of the transistors, good electrostatic discharge (ESD) performance, low (e.g., minimal) capacitive loading of the combined transmit/receive port (e.g., RF port), and high (e.g., maximum) impedance of the transmitter in the off state (e.g., receive mode) to avoid degrading the signal received by the receiver. Power amplifier and transmit/receive switching configurations described herein can provide a good compromise between these desirable properties and can be customized to improve particular properties.

Example PA and transmit/receive configurations described below include a transmit/receive switch connected between a secondary winding of the PA's output transformer and ground. The switch configuration reduces the voltage drop as compared to direct series transmit/receive switches and reduces the voltage swings to which the switch is exposed. This switch configuration also increases PA output power provided to the antenna, improves the reliability of the switch, and improves the noise figure for an LNA of a receiver that shares the antenna during receive mode.

Figure 2:
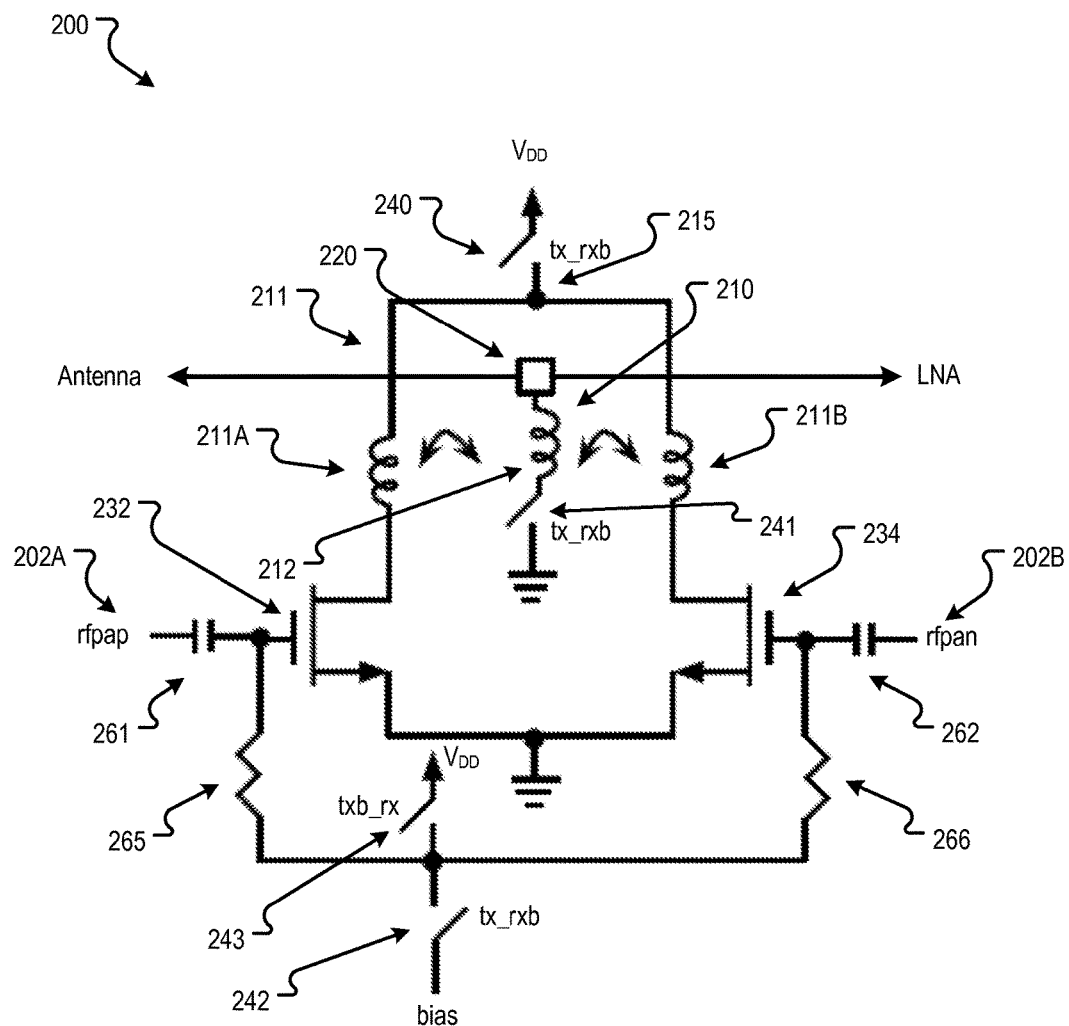
FIG. 2 is a schematic diagram of an example power amplifier connected to an RF port.

FIG. 2 is a schematic diagram of an example PA 200 connected to an RF port 220. The PA 200 and RF port 220 may be part of a transceiver (e.g., transmitter and receiver) that transmits and receives signals using an antenna (e.g., an antenna common to the transmitter and receiver). The transceiver may be part of a multi-antenna system, such as a phased array antenna system.

The RF port 220 is a port that electrically connects (e.g., using conductors) the PA 200 and an LNA (of a receiver) to an antenna. In this example, the RF port 220 is electrically connected to an output transformer 210 of the PA 200. In particular, the RF port 220 is connected to one terminal (or one end) of a secondary winding 212 of the output transformer 210. The other terminal (or other end) of the secondary winding 212 is connected to a transmit/receive switch 241 of the PA 200.

The output transformer 210 may be implemented (e.g., fabricated) on-chip. For example, all or a portion of the PA's components, including the output transformer 210, may be implemented in a single (or multiple) integrated circuit (IC) chip(s). In some implementations, one or more of the RF port 220, the LNA, a transmitter connected to the PA 200, and a receiver connected to the LNA may be implemented on a single IC chip. In an IC chip implementation, the RF port 220 may be a pin of the IC circuit that is electrically coupled to the antenna.

The output transformer 210 includes the secondary winding 212 and a primary winding 211. The example primary winding 211 is illustrated as two separate windings 211A and 211B for the purpose of illustrating a tap 215. However, the primary winding 210A and 210B may be implemented as a single winding. The tap 215 may be a center tap. For example, the tap 215 may be located at or near the middle of the primary winding 211. A switch 240 selectively connects the tap 215 of the primary winding 211 to a power supply $V_{DD}$ of the PA 200.

The PA 200 includes two transistors 232 and 234 that are connected to a differential RF input 202A and 202B. In this example, the transistors 232 and 234 are metal-oxide-semiconductor field effect transistors (MOSFETs). In some implementations, the transistors 232 and 234 may be FETs, bipolar transistors, or another appropriate device. The gate of the transistor 232 is connected to differential RF input 202A by way of a coupling capacitor 261. Similarly, the gate of the transistor 234 is connected to differential input 202B by way of a coupling capacitor 262.

The gates of the transistors 232 and 234 are also connected to respective resistors 265 and 266. In the illustrated configuration, the transistors 232 and 234, the transformer 210, and the resistors 265 and 266 form a differential inverted amplifier. Other appropriate amplifier configurations are also possible.

The PA 200 also includes switches 242 and 243, which may be implemented as transistors (e.g., bipolar transistors, FETs, or MOSFETs). The switch 242 selectively connects a bias voltage to the gates of the transistors 232 and 234 by way of the resistors 265 and 266. The resistance of the resistors 265 and 266 may be selected to provide an appropriate bias voltage to the gates of the transistors 232 and 234. As described in more detail below, the bias voltage is provided to the gates of the transistors during a transmit mode of operation to bias the transistors 232 and 234. The switch 243 selectively connects the gates of the transistors 232 and 234 to the power supply voltage $V_{DD}$. The power supply voltage $V_{DD}$ may be provided to the gates of the transistors 232 and 234 by way of the resistors 265 and 266 during a receive mode of operation. The switches 242 and 243 and the resistors 265 and 266 may be part of a biasing circuit that biases the transistors 232 and 234 based on the mode of operation of the PA 200.

The position of each switch 240-243 of the PA 200 is set based on the mode of the transceiver that includes the PA 200. For example, the transceiver may have a transmit mode in which the transmitter of the transceiver is transmitting signals to the antenna and a receive mode in which the receiver of the transceiver is receiving signals from the antenna. During the transmit mode, it is desirable to have a high impedance (e.g., maximum or greater than a threshold impedance) into the LNA to prevent degradation of signals output by the PA 200. Similarly, during the receive mode, it is desirable to have a high impedance (e.g., maximum or greater than a threshold impedance) into the PA 200 to prevent degradation of the signals received from the antenna.

During the transmit mode, the switches 240-242 are closed and the switch 243 is open. In this configuration, the switch 242 allows the bias voltage to bias the transistors 232 and 234 to an appropriate level of conductivity. The switch 240 allows current from the power supply voltage to flow through the primary winding 211 of the transformer 210 and through the biased transistors 232 and 234. As described in more detail below, at this level of bias, the transistors 232 and 234 are in saturation mode and provide at least a threshold voltage drop and do not provide an effective short to ground. In addition, the RF differential input 202A and 202B is amplified by the inverting differential amplifier and the amplified signal is output to the antenna through the RF port 220. As the transmit/receive switch 241 is closed during transmit mode, the secondary winding is connected to ground.

Figure 1:
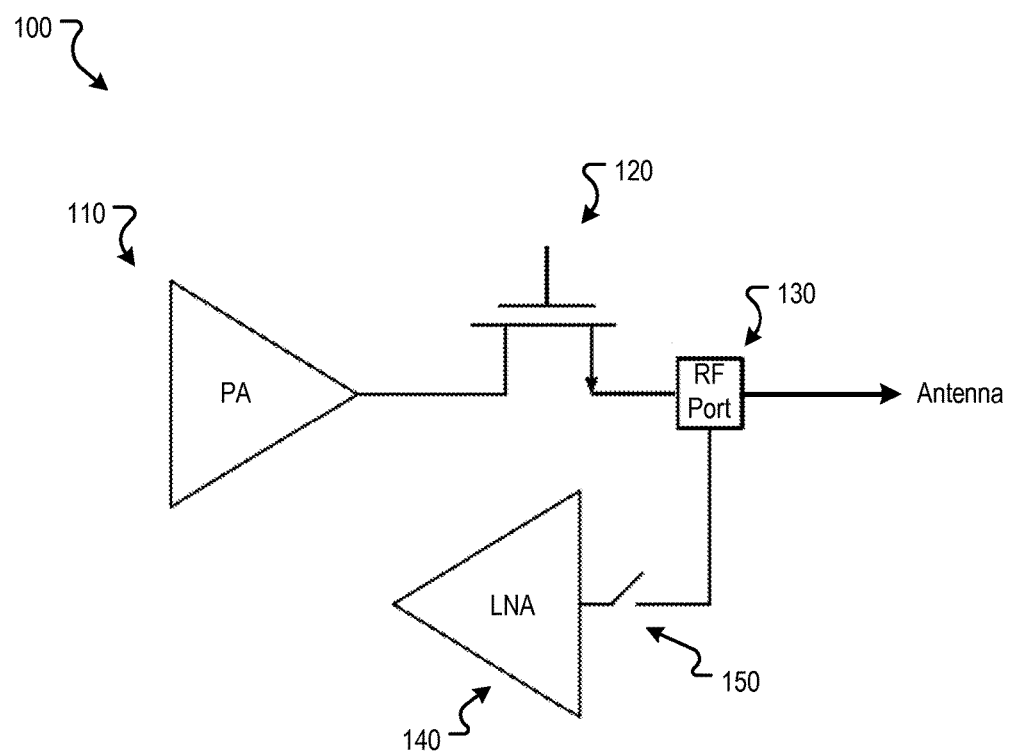
FIG. 1 is a schematic diagram of a transmit/receive circuit for a radio frequency (RF) port.

Although the transmit/receive switch 241 may provide some loss to the PA output signal, this loss can be reduced using a low resistance switch 241. The loss is also reduced by positioning the transmit/receive switch 241 between the secondary winding 212 and ground as the transmit/receive switch 241 is not exposed to the level of signal swings (e.g., voltage level swings) that the switch 241 would be exposed to in a direct series configuration as shown in FIG. 1. As the switch 241 is exposed to a lower level of signal swings, the switch 241 can be smaller and still more reliable than a direct series switch. Such a switch 241 also exhibits less parasitic capacitance than a larger direct series switch.

During the receive mode, the switches 240-242 are open and the switch 243 is closed. In this configuration, the switch 243 connects the gate of each transistor 232 and 234 to the power supply voltage $V_{DD}$. As the power supply voltage $V_{DD}$ is at a higher voltage level than the bias voltage, the transistors 232 and 234 are in triode mode and the source-to-drain path of each transistor 232 and 234 provides less resistance in the receive mode than in the transmit mode. For example, the source-to-drain path of each transistor 232 and 234 may provide close to zero resistance (e.g., within a threshold amount of zero resistance) resulting in the primary winding 211 of the transformer 210 effectively being shorted to ground in the receive mode. In the transmit mode, this source-to-drain resistance is higher to amplify (e.g., increase or reduce the intensity of) the RF input signal. This higher resistance results in a voltage drop (e.g., at least a threshold voltage drop) between the source and drain.

This effective short is reflected to the secondary winding 212 of the transformer 210. However, as the switch 241 is open in receive mode, the impedance into the PA 200 is high (e.g., greater than a threshold impedance or at least a threshold amount higher than the input impedance of the LNA). This high impedance improves the strength and integrity of the signal provided from the antenna to the LNA. In addition, the strength and integrity of the signals output by the PA 200 and the strength and integrity of the signals received by the LNA can be improved using impedance matching. For example, during transmit mode, the output impedance of the PA 200 can be matched to the input impedance of the antenna. Similarly, during receive mode, the input impedance of the LNA can be matched to the output impedance of the antenna.

Figure 3:
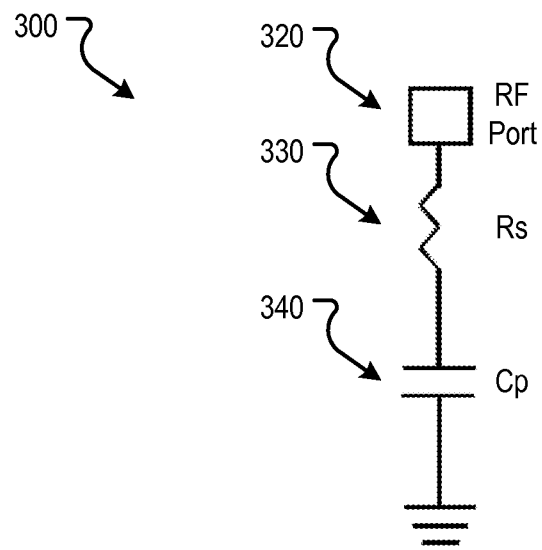
FIG. 3 is a schematic diagram of an example impedance equivalent circuit.

The impedance into the PA 200 (e.g., the impedance seen from the RF port 220) can be modeled as a resistance and capacitance based on the resistance and parasitic capacitance caused by components of the PA 200. FIG. 3 is a schematic diagram of an example impedance equivalent circuit 300. The example impedance equivalent circuit 300 illustrates the impedance into the PA 200 of FIG. 2 during the receive mode of operation. For example, the impedance equivalent circuit 300 illustrates the impedance into the PA 200 as seen from the RF port 220 when the transmit/receive switch 241 is open.

The circuit 300 includes an RF port 320 (e.g., the RF port 220 of FIG. 2), a series resistance 330, and a parasitic capacitance 340. The series resistance 330 is the resulting resistance of the finite quality factor (Q) of the secondary winding 212 of the transformer 210 and the finite resistance of the short on the primary side of the transformer 210. For example, the conductors between the primary winding 211 and the transistors 232 and 234, the conductors between the transistors 232 and 234 and ground, and/or the transistors 232 and 234 may contribute some resistance to the series resistance 330. The transmit/receive switch 241 and/or the secondary winding 212 of the transformer 210 may contribute some parasitic capacitance to the parasitic capacitance 340.

Figure 5:
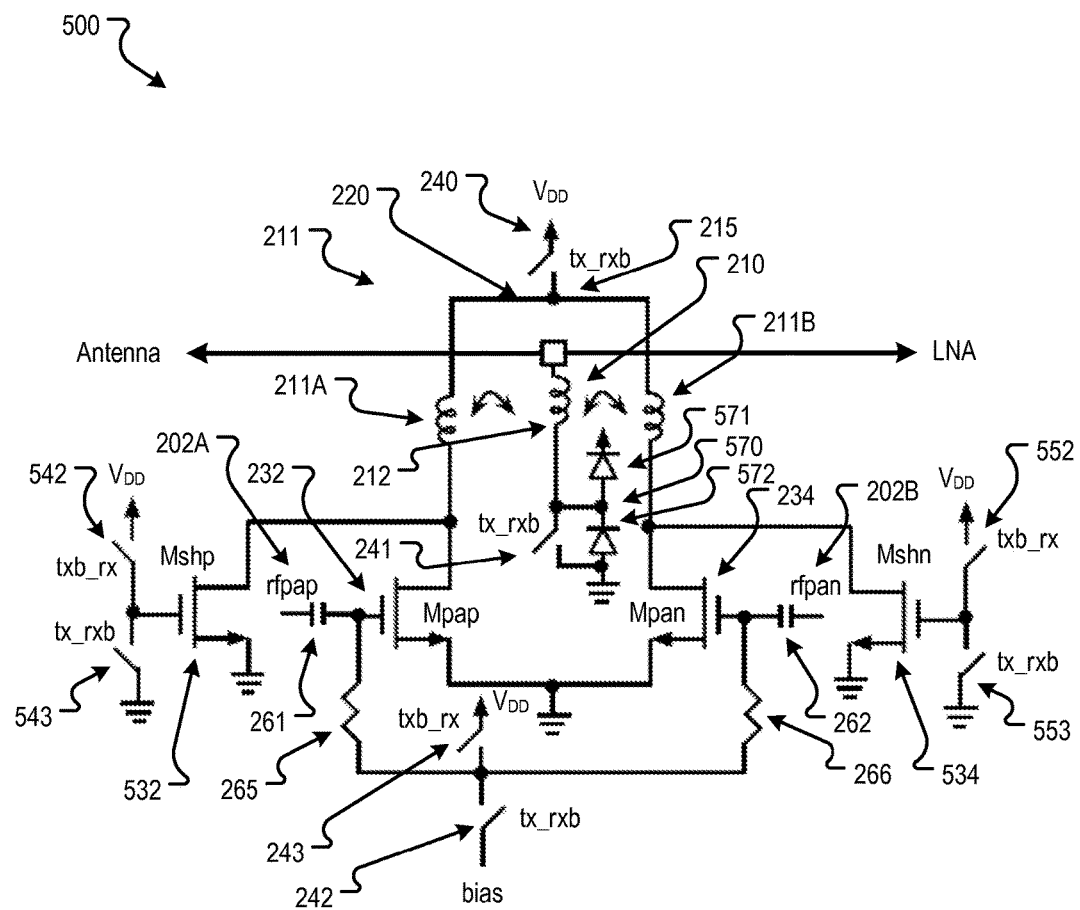
FIG. 5 is a schematic diagram of another example power amplifier connected to an RF port.

To provide better signal quality of signals received from the antenna and provided to the LNA, the series resistance 330 and the parasitic capacitance 340 should be decreased (e.g., minimal). The lower parasitic capacitance 340 results in higher impedance for the PA 200 during receive mode. To decrease the series resistance 330, larger transistors 232 and 234 may be used or multiple transistors in parallel may be used, as shown in FIG. 5 and described below. To decrease the parasitic capacitance 340, a smaller transmit/receive switch 241 may be used. For example, the transmit/receive switch 241 may be implemented as a MOSFET. In such an implementation, the drain-to-gate and the drain-to-bulk has parasitic capacitance that is smaller with a smaller transistor size. However, a smaller transmit/receive switch 241 may increase the resistance of the transmit/receive switch 241 during transmit mode causing some insertion loss on the signals output by the transmitter. The transformer 210 and the size of the switch 241 can be selected to balance desired performance characteristics of the transmitter and receiver.

Figure 4:
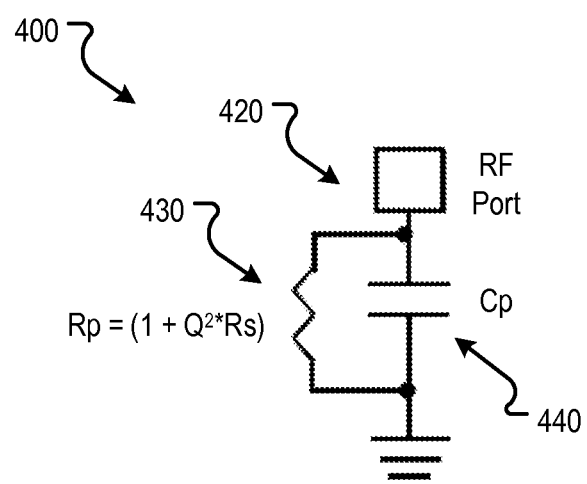
FIG. 4 is a schematic diagram of another example impedance equivalent circuit.

FIG. 4 is a schematic diagram of another example impedance equivalent circuit 400. The impedance equivalent circuit 400 is a parallel equivalent circuit of the circuit 300 of FIG. 3. The parasitic capacitance 440 is the same as the parasitic capacitance 340 of FIG. 3. The parallel resistance 430 is based on the series resistance 330 and the Q of the secondary winding 212 of the transformer 210. For example, the parallel resistance 430 can be based on the relationship $Rp=1+Q^2*Rs$, where Rp is the parallel resistance 430, Rs is the series resistance 330, and Q is the Q of the secondary winding 212 of the transformer 210. To provide better signal quality in receive mode, the parallel resistance 430 should be increased (e.g., maximized). The parallel resistance 430 can be increased using a transformer having a secondary winding with a higher Q. Minimizing the parasitic capacitance due to the transmit/receive switch 241 and designing the transformer secondary for reduced parasitic capacitance will increase (e.g., maximize) the parallel resistance 430 for a given frequency of operation. If the parallel resistance is high relative to the impedance the LNA presents to the antenna, then the degradation to the noise figure of the received signals due to the transmit/receive switch 241 should be low. In addition, the sizing of the transmit/receive switch 241 provides a direct trade-off between output power efficiency for transmitted signals due to switch insertion loss and noise figure degradation due to parasitics.

Output power of transmitted signals to the antenna may also be adjusted based on the turns ratio of the transformer 210. This adjustable power output allows for a wider range of power levels than available when using a direct series switch as shown in FIG. 1. For example, if higher output power is desired, the PA 200 may be configured with a lower impedance on the primary side of the transformer 210. In this configuration, a step up transformer (e.g., with a 1:2 turns ratio or a 1:3 turns ratio) may step up the voltage of a transmit signal before the signal is sent to the antenna. If lower output power is desired, the PA 200 may be configured with a higher impedance on the primary side of the transformer 210. In this configuration, a step down transformer (e.g., with a 2:1 turns ratio or a 3:1 turns ratio) may be step down the voltage of a transmit signal before the signal is sent to the antenna.

FIG. 5 is a schematic diagram of another example PA 500 connected to an RF port 220. The example PA 500 can include the same or similar components as the PA 200 of FIG. 2. For example, the PA 500 includes the RF port 220, a transformer 210, transistors 232 and 234, switches 240-243, capacitors 261 and 262, and resistors 265 and 266. Each of these components can be the same or similar to the corresponding components of the PA 200 of FIG. 2. The components can have the same characteristics or differing characteristics. For example, the transistors 232 and 234 of the PA 200 may be the same size, larger, or smaller than the transistors 232 and 234 of the PA 500.

The PA 500 also includes an ESD protection circuit 570. The ESD protection circuit protects the transmit/receive switch 241 from ESD, e.g., from a person touching an IC chip that contains the PA 500. The ESD protection circuit 570 can also protect the LNA during an ESD event as the secondary winding 212 of the transformer 210 is effectively a short at the frequency of interest for ESD.

The example ESD protection circuit 570 is connected between the secondary winding 212 of the transformer 210 and the transmit/receive switch 241 and includes two diodes 571 and 572. Other numbers and other configurations of diodes are also possible. In this example, the diode 571 is connected between the secondary winding 212 and the power supply $V_{DD}$. The diode 571 can route ESD currents that are positive in polarity from the secondary winding 212 to the power supply. The diode 572 is connected between the secondary winding 212 and ground. The diode 572 can route ESD currents that are negative in polarity to ground. As the diodes 571 and 572 are not exposed to large signal swings due to their connection between the secondary winding 212 and the transmit/receive switch 241, the diodes 571 and 572 should not turn on even with high signal swings of the RF input signal.

The PA 500 also includes transistors 532 and 534. These transistors 532 and 534 can improve the quality of the effective short of the primary winding 211 to ground during receive mode. This improvement in quality of the effective short is due to the decrease in the series resistance 330 of FIG. 3 caused by the added conductive paths between the primary winding 211 and ground. The PA 500 also includes switches 542 and 543 that control the bias for the transistor 532. In transmit mode, the switch 543 is closed (and the switch 542 is open) connecting the gate of the transistor 532 to ground. This biasing turns the transistor 532 off, preventing current from flowing through the source and drain of the transistor 532. In receive mode, the switch 542 is closed (and the switch 543 is open) connecting the gate of the transistor 532 to the power supply $V_{DD}$. This biasing turns the transistor 532 on and causes the source-to-drain of the transistor 532 to effectively short the primary winding 211 of the transformer 210 to ground. This effective short, in combination with the effective short caused by the transistors 232, 234, and 534 (described below) improves the effective short of the primary winding 211.

In transmit mode, the switch 553 is closed (and the switch 552 is open) connecting the gate of the transistor 534 to ground. This biasing turns the transistor 534 off, preventing current from flowing through the source and drain of the transistor 534. In receive mode, the switch 552 is closed (and the switch 553 is open) connecting the gate of the transistor 534 to the power supply $V_{DD}$. This biasing turns the transistor 534 on and causes the source-to-drain of the transistor 534 to effectively short the primary winding 211 of the transformer 210 to ground.

Although the example PA 500 is illustrated as having both the ESD protection circuit 570 and the transistors 532 and 534, other PAs may have one or the other. For example, an implementation may benefit from ESD protection, but not require the improved receive signal quality provided by the improved short. In this example, the PA may include the ESD protection circuit 570 but not the transistors 532 and 534.

Figure 6:
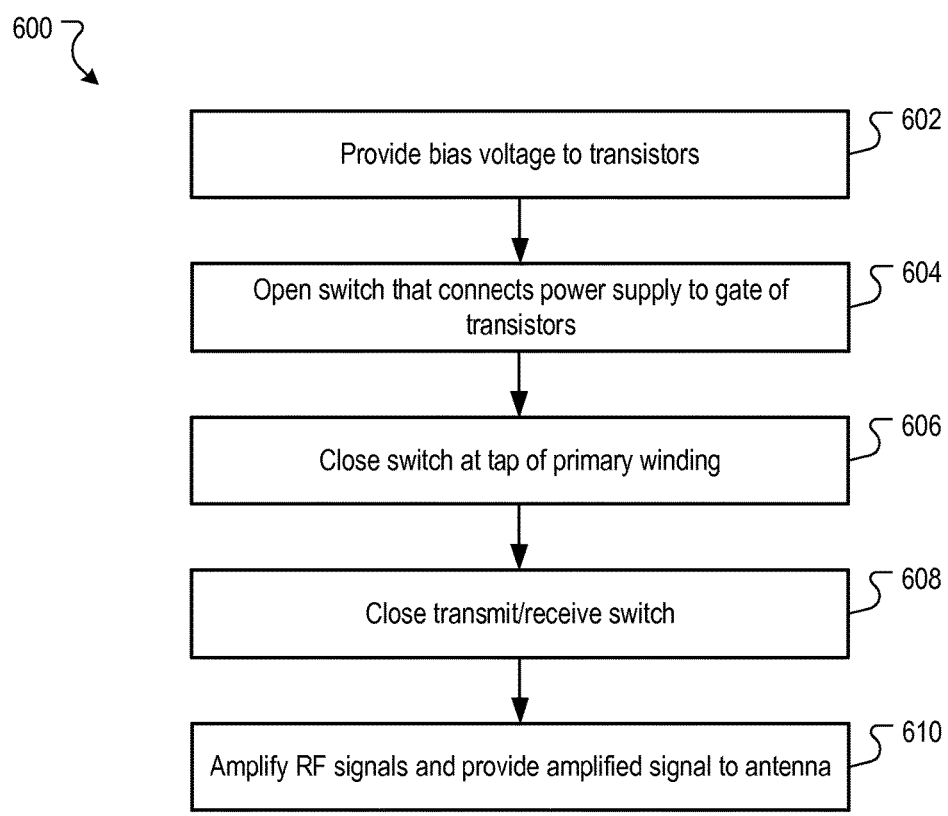
FIG. 6 is a flow chart of an example process for providing signals from a power amplifier to an antenna.

FIG. 6 is a flow chart of an example process 600 for providing signals from a power amplifier to an antenna. Operations of the process 600 can be implemented, for example, using a data processing apparatus, such a data processing apparatus of a transceiver that transmits and receives signals using a common antenna. The process 600 can also be implemented by instructions stored on a non-transitory computer storage medium, where execution of the instructions by a data processing apparatus cause the data processing apparatus to perform the operations of the process 600. The example process 600 is described with reference to the PA 200 of FIG. 2. However, the process 600 can also be performed using components of the PA 500 of FIG. 5.

A bias voltage is provided to the gates of the transistors 232 and 234 (602). The bias voltage may be at a voltage level that places the transistors 232 and 234 I saturation mode and causes the transistors 232 and 234, in combination with the resistors 265 and 266, to amplify an input RF signal 202A and 202B. However, the bias voltage may be at a voltage level less than a voltage level that would place the transistors 232 and 234 in triode mode to effectively short the primary winding 211 of the transformer 210 to ground.

A switch 243 that connects a power supply to the gate of the transistors 232 and 234 is opened (604). This switch 243, if closed, would bias the transistors 232 and 234 to triode mode such that the transistors 232 and 234 would effectively short the primary winding 211 to ground. In some implementations, this switch 243 may be opened before or at the same time as the switch 242 is closed.

A switch 240 that connects a power supply to the tap 215 (e.g., center tap) of the primary winding 211 is closed (i.e., turned on) (606). This switch position allows current from the power supply to flow through the source and drain of the transistors 232 and 234.

A transmit/receive switch 241 that is connected between the secondary winding 212 of the transformer 210 and ground is closed (608). This allows the amplified RF signal to flow to the RF port 220 and to the antenna connected to the RF port 220.

RF signals are amplified and provided to the antenna (610). For example, a transmitter electrically connected to the RF input 202A and 202B may provide the RF signals to the RF inputs 202A and 202B. The RF signals may be amplified by the PA 200 and provided to the RF port 220. The antenna connected to the RF port 220 may then receive the amplified RF signal and propagate an RF signal based on the amplified RF signal.

Figure 7:
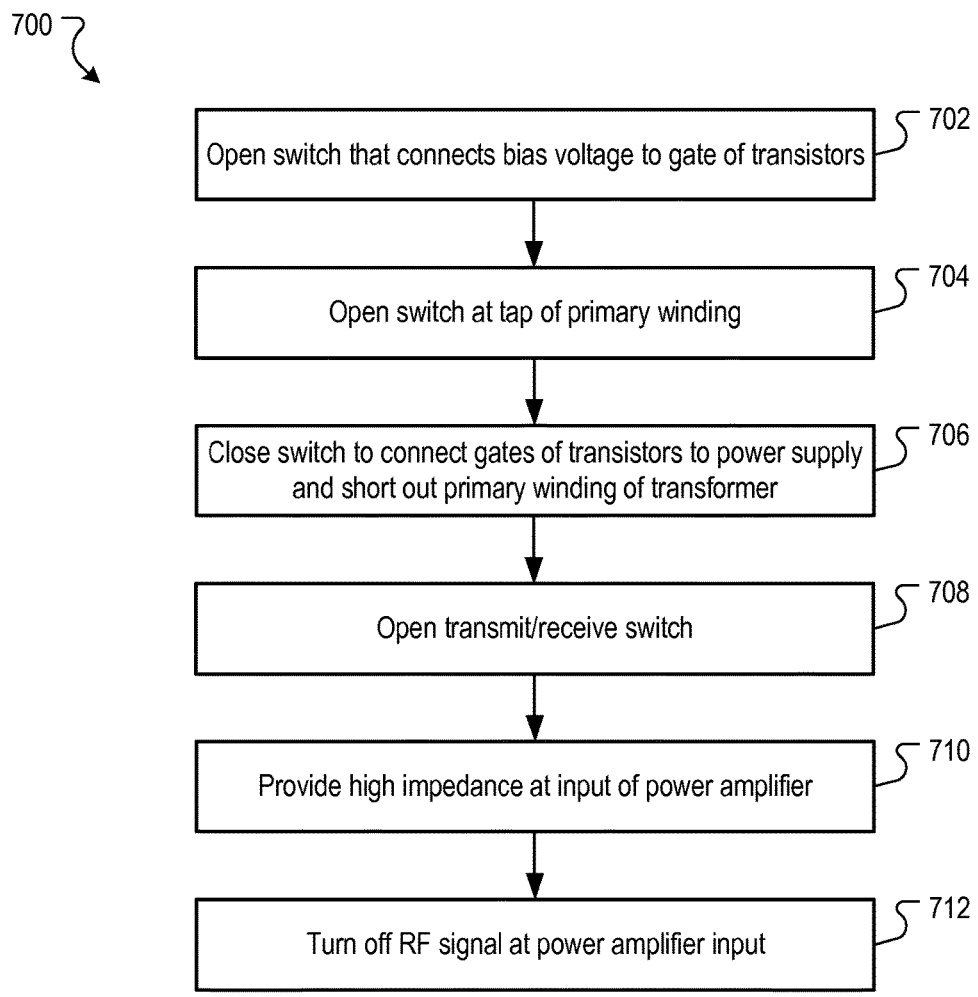
FIG. 7 is a flow chart of an example process for providing a high impedance input to a power amplifier.

FIG. 7 is a flow chart of an example process 700 for providing a high impedance input to a power amplifier. Operations of the process 700 can be implemented, for example, using a data processing apparatus, such as a data processing apparatus of a transceiver that transmits and receives signals using a common antenna. The process 700 can also be implemented by instructions stored on a non-transitory computer storage medium, where execution of the instructions by a data processing apparatus cause the data processing apparatus to perform the operations of the process 700. The example process 700 is described with reference to the PA 200 of FIG. 2. However, the process 700 can also be performed using components of the PA 500 of FIG. 5.

A power supply voltage is provided to the gates of transistors 232 and 234 (702). A switch 242 that connects a bias voltage to the gates of the transistors 232 and 234 is opened (702). This blocks the bias voltage from biasing the transistors into saturation mode.

A switch 240 at a tap 215 (e.g., center tap) of the primary winding 211 is opened (704). This prevents current from the power supply from flowing through the source and drain of the transistors 232 and 234.

A switch 243 that connects the gates of the transistors 232 and 234 to the power supply $V_{DD}$ is closed (706). The power supply voltage is at a high enough voltage level to bias the transistors 232 and 234 in triode mode such that the transistors 232 and 234 have close to zero resistance between its source and drain. This provides an effective short between the primary winding 211 of the transformer 210 and ground.

A transmit/receive switch that is connected between the secondary winding 212 of the transformer 210 and ground is opened (708). In this configuration, the PA 200 provides a high impedance (e.g., greater than a threshold impedance or greater than an input impedance of an LNA connected to the RF port 220) at the input of the PA 200 (710). This impedance can be modeled as shown in FIGS. 3 and 4 and described above. The RF signal at the power amplifier input is turned off during received mode (712).

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:
1. A circuit, comprising:
   a power amplifier that includes a transformer having a primary winding and a secondary winding, the secondary winding having (i) a first terminal on a first end of the secondary winding and (ii) a second terminal on a second end of the secondary winding opposite the first end; and
   a transmit/receive switch electrically connected between the first terminal of the secondary winding and electrical ground, wherein:

the second terminal of the secondary winding is electrically connected to both (i) an antenna that transmits signals based on an output of the power amplifier and (ii) an input of a second amplifier that is also connected to the antenna; and the transmit/receive switch selectively switches between:
 a closed position that connects the secondary winding to ground in a transmit mode; and
 an open position that disconnects the secondary winding from ground in a receive mode, wherein an impedance of the power amplifier as seen from the second terminal of the secondary winding is at least a threshold amount higher than an input impedance of the second amplifier connected to the antenna in response to the transmit/receive switch being in the open position.

2. The circuit of claim 1, further comprising one or more diodes electrically connected to a conductor that electrically connects the first end of the secondary winding to the transmit/receive switch, the one or more diodes providing a path for electrostatic discharge currents.

3. The circuit of claim 1, further comprising one or more transistors that effectively short the primary winding of the transformer to electrical ground in the receive mode.

4. The circuit of claim 3, wherein the one or more transistors are biased in a triode mode of operation in the receive mode.

5. The circuit of claim 3, wherein the one or more transistors provide at least a threshold voltage drop between the primary winding and ground during the transmit mode.

6. The circuit of claim 5, wherein the one or more transistors are biased in a saturation mode of operation in the transmit mode.

7. The circuit of claim 3 wherein the one or more transistors include:
 a first transistor that electrically connects a first end of the primary winding to ground; and
 a second transistor that electrically connects a second end of the primary winding to ground.

8. The circuit of claim 1, wherein the second amplifier comprises a low noise amplifier (LNA) that is electrically connected to the antenna and to a receiver.

9. The circuit of claim 1, wherein the power amplifier, the transformer, and the transmit/receive switch are fabricated on an integrated circuit chip.

10. A circuit comprising:
 a transformer having a primary winding and a secondary winding, the primary winding having a first terminal at a first end of the primary winding and a second terminal at a second end of the primary winding opposite the first end, the secondary winding having a third terminal at a first end of the secondary winding and a fourth terminal at a second end of the secondary winding opposite the first end;
 a differential amplifier comprising a first transistor and a second transistor, the first transistor being electrically connected between the first terminal and electrical ground and the second transistor being connected between the second terminal and electrical ground;
 a transmit/receive switch connected between the third terminal and electrical ground, the transmit/receive switch having a first position that connects the third terminal to ground during a transmit mode of operation and a second position that disconnects the third terminal from ground in a receive mode of operation; and
 a transmit/receive port electrically connected to the fourth terminal that is also connected to an antenna and an input of a second amplifier.

11. The circuit of claim 10, further comprising an electrostatic discharge circuit connected between the transmit/receive switch and the secondary winding of the transformer.

12. The circuit of claim 11, wherein the electrostatic discharge circuit comprises one or more diodes.

13. The circuit of claim 10, wherein the circuit comprises an integrated circuit.

14. The circuit of claim 10, further comprising a bias circuit that is connected to a gate of the first transistor and a gate of the second transistor and that biases the first transistor and the second transistor in a triode mode of operation in the receive mode.

15. The circuit of claim 10, further comprising a bias circuit that is connected to a gate of the first transistor and a gate of the second transistor and that biases the first transistor and the second transistor in a saturation mode of operation in the transmit mode.

16. The circuit of claim 10, wherein the second amplifier comprises a low noise amplifier (LNA).

17. The circuit of claim 10, wherein the differential amplifier is an inverting differential amplifier.

18. A method comprising:
 providing a first biasing voltage to a first transistor and a second transistor of a power amplifier, the bias voltage being at a voltage level that causes the first transistor and the second transistor to operate in a saturation mode of operation, wherein the first transistor is connected between a first terminal of a primary winding of a transformer and electrical ground and the second transistor is connected between a second terminal of the primary winding and electrical ground;
 activating a transmit/receive switch of the power amplifier to place the power amplifier in a transmit mode of operation, the transmit/receive switch being connected between a first terminal of a secondary winding of the transformer and ground, wherein the secondary winding includes a first end and a second end opposite the first end, and wherein the first terminal is on the first end;
 receiving, by the power amplifier, a signal;
 amplifying, by the power amplifier, the received signal; and
 providing the amplified signal to an antenna, wherein the antenna and an input of a second amplifier are both connected to a second terminal of the second winding of the transformer, wherein the second terminal is on the second end of the secondary winding.

19. The method of claim 18, further comprising:
 providing a second biasing voltage to the first transistor and the second transistor, the second biasing voltage being at a voltage level that causes the first transistor and the second transistor to operate in a triode mode of operation;
 deactivating the transmit/receive switch; and
 providing at least threshold impedance at an output of the power amplifier as seen from the antenna.

20. The method of claim 19, further comprising:
 receiving, from the antenna, a second signal; and
 providing the second signal to the second amplifier, wherein the second amplifier comprises a low noise amplifier.

* * * * *